(12) United States Patent
  Pelisson

(10) Patent No.: US 11,080,887 B2
(45) Date of Patent: Aug. 3, 2021

(54) METHOD AND DEVICE FOR RECOGNISING DISTANCE IN REAL TIME

(71) Applicant: COMMISSARIAT A L'ENERGIE ATOMIQUE ET AUX ENERGIES ALTERNATIVES, Paris (FR)

(72) Inventor: Roland Pelisson, Ma Terrasse (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 77 days.

(21) Appl. No.: 16/401,801

(22) Filed: May 2, 2019

(65) Prior Publication Data
  US 2019/0340786 A1   Nov. 7, 2019

(30) Foreign Application Priority Data
  May 3, 2018 (FR) ...................... 18 53813

(51) Int. Cl.
  *G06K 9/00* (2006.01)
  *G06T 7/73* (2017.01)
  (Continued)

(52) U.S. Cl.
  CPC ............... *G06T 7/74* (2017.01); *G06T 5/008* (2013.01); *G06T 5/20* (2013.01); *H04N 5/247* (2013.01);
  (Continued)

(58) Field of Classification Search
  CPC ......... G06T 77/136; G06T 7/55; G06T 7/564; G06T 7/593; G06T 7/596; G06T 7/74;
  (Continued)

(56) References Cited

U.S. PATENT DOCUMENTS 5,118,195 A * 6/1992 Dobbie .............. G01N 21/8921
                                                    250/559.46
10,444,752 B2 * 10/2019 Kim ..................... G05D 1/0055
(Continued)

FOREIGN PATENT DOCUMENTS

CA      2245044 A1    2/1999
JP    61-240376 A    10/1986

OTHER PUBLICATIONS

D. Honegger, T. Sattler and M. Pollefeys, "Embedded real-time multi-baseline stereo," 2017 IEEE International Conference on Robotics and Automation (ICRA), Singapore, 2017, pp. 5245-5250, doi: 10.1109/ICRA.2017.7989615. (Year: 2017).*

(Continued)

*Primary Examiner* — Andrew M Moyer
(74) *Attorney, Agent, or Firm* — Oblon, McClelland, Maier & Neustadt, L.L.P.

(57) ABSTRACT

A device for recognizing distance in real time includes first, second, and cameras. The third camera arranged nearer the first camera than the second camera. The first, second and third cameras acquire simultaneously first, second and third images, respectively, and an electronic circuit of the device estimates the distance of an object as a function of a stereoscopic correspondence established between first and second elements representative of the object. The first and second elements belong to the first and second images, respectively. The stereoscopic correspondence is established by a relationship between the first elements and corresponding third elements belonging to the third image.

15 Claims, 10 Drawing Sheets
(2 of 10 Drawing Sheet(s) Filed in Color)

(51) Int. Cl.
*H04N 13/243* (2018.01)
*G06T 5/00* (2006.01)
*G06T 5/20* (2006.01)
*H04N 5/247* (2006.01)
*H04N 5/30* (2006.01)
*H04N 13/00* (2018.01)

(52) U.S. Cl.
CPC ............. *H04N 5/30* (2013.01); *H04N 13/243* (2018.05); *H04N 2013/0074* (2013.01)

(58) Field of Classification Search
CPC .......... G06T 5/008; G06T 5/20; G06T 17/05; G06T 2207/20088; G06T 2207/10012; H04N 13/243; H04N 5/30; H04N 5/247; H04N 2013/0074; H04N 2013/0081; G06K 9/209; G06K 9/20; G03B 35/00; G05D 1/0251; G05D 1/0253
USPC .......................................... 382/103–107, 154
See application file for complete search history.

(56) References Cited

U.S. PATENT DOCUMENTS

| | | | | |
|---|---|---|---|---|
| 10,455,219 | B2* | 10/2019 | Cohen | H04N 13/122 |
| 2006/0018509 | A1* | 1/2006 | Miyoshi | H04N 13/117 |
| | | | | 382/104 |
| 2006/0144158 | A1* | 7/2006 | Hartmann | G01B 11/2425 |
| | | | | 73/761 |
| 2012/0177285 | A1* | 7/2012 | Tsurube | H04N 13/243 |
| | | | | 382/154 |

OTHER PUBLICATIONS

E. Richter, "Hand Pose Reconstruction using a Three-Camera Stereo Vision System," Aug. 1, 2011 University of Hamburg, pp. 26-27, 43-54, 59-61, 86-88 (Year: 2011).*
French Search Report dated Feb. 7, 2019 in Patent Application No. 1853813, 3 pages (with English translation of categories of cited documents).
Honegger, D. et al. "Embedded Real-time Multi-Baseline Stereo" 2017 IEEE International Conference on Robotics and Automation (ICRA), XP055546008, 2017, pp. 5245-5250.
Richter, E. "Hand Pose Reconstruction using a Three-Camera Stereo Vision System" Technical Aspects of Multimodal Systems, Department Informatics, University of Hamburg https://tams.informatik.uni-hamburg.de/people/erichter/doc/thesis.pdf, XP055546029, 2011, 157 Pages.
Kim, M.Y. et al. "An active trinocular vision system of sensing indoor navigation environment for mobile robots" Sensors and Actuators: A Physical, https://www.researchgate.net/publication/223369764_An_active_trinocular_vision_system_of_sensing_indoor_navigation_environment_for_mobile_robots, XP055547000, 2006, 18 Pages.
Mattoccia, S. "Stereo Vision: Algorithms and Applications" Department of Computer Science (DISI) University of Bologna, 2013, 208 Pages.

* cited by examiner

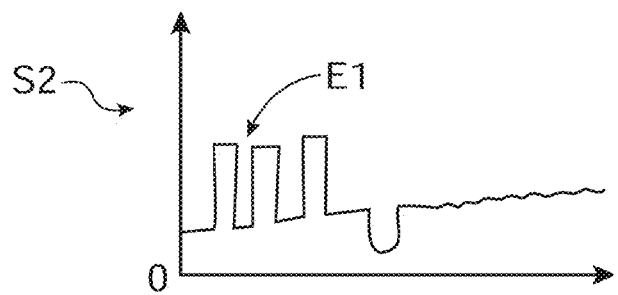
FIG.4B
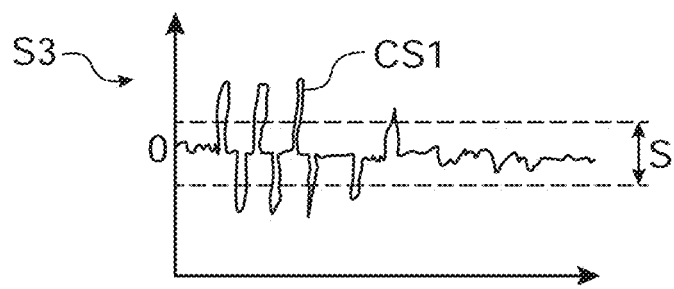
FIG.4C
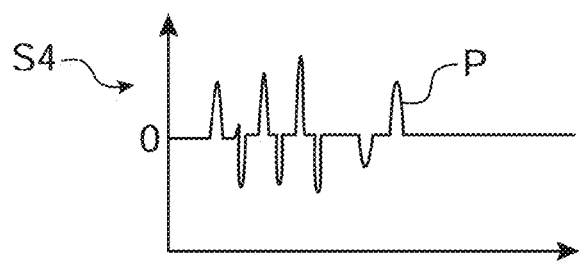
FIG. 4H
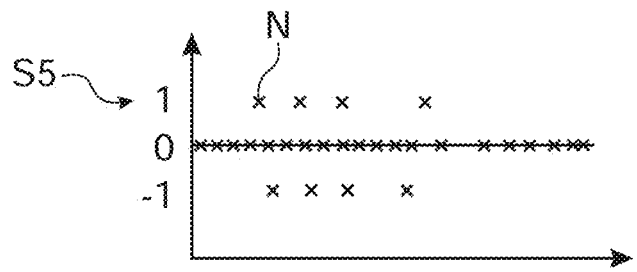
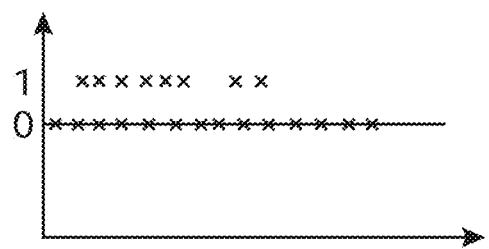
FIG. 4I FIG. 4J

METHOD AND DEVICE FOR RECOGNISING DISTANCE IN REAL TIME

TECHNICAL FIELD

The present invention relates to the distance recognition field and more specifically according to the stereoscopic measurement technique based on two cameras intercalated by a third guiding camera.

PRIOR ART

Generally speaking, the stereoscopic measurement technique consists in using two images taken by two cameras spaced apart, in order to determine the distances of objects taken in the image. The distances are computed by matching the contents of the two images.

However, a stereoscopic system with two cameras is easily made defective by masked objects or repetitive structures such as for example a vertical grid. Indeed, the two cameras may lead to confusion between for example two vertical bars of the grid.

In order to resolve in part this type of problem, it is known from other stereoscopic measurement techniques using more than two cameras to duplicate the viewpoints and the potential matchings. Such an example is described in the document CA2245044 which concerns stereovision computations carried out on different pairs of cameras. The different computations are compared in order to reject poor matchings. Another example is described in the document JP561240376 which uses three focusing systems to avoid stereovision errors when for example a thin object is situated behind another and then appears inverted between the two images.

All these techniques make the basic resolution cumbersome with a quite low gain and necessitate complex algorithms requiring great computing power.

The aim of the present invention is to propose a method and a device for recognising distance in real time, overcoming the aforesaid drawbacks, in particular by resolving the problems due to repetitive structures or masked objects while not having to resort to complex computation algorithms.

DESCRIPTION OF THE INVENTION

The present invention is defined by a device for recognising distance in real time including first and second cameras, comprising:
  a third camera arranged nearer the first camera than the second camera, said first, second and third cameras being configured to acquire simultaneously first, second and third images respectively, and
  an electronic circuit configured to estimate the distance of an object as a function of a stereoscopic correspondence established between the first and second elements representative of said object and belonging to the first and second images respectively, said stereoscopic correspondence being established by taking into account a relationship between said first elements and corresponding third elements belonging to the third image.

This device makes it possible to facilitate the determination of relationships between the contents of images while having good resolution for the recognition of distances, and to do so while being capable of not allowing itself to be tricked by repetitive structures or masked objects. Indeed, the fact that the third camera is very close to the first camera means that the shift between the contents of the third and first images is very small making it possible to reduce the correspondence search zone and consequently to determine a very precise application between the contents of the first and third images. Moreover, the further away cameras make it possible to increase the resolution of the estimation of distances of the different objects. Thus, a distance in stereovision in real time is made without having to resort to complex computation algorithms.

Advantageously, the electronic circuit is configured to extract from the first, second and third images first, second and third elements selected from the following elements: contours, image segments, and rectangular image sub-zones.

This makes it possible to minimise the amount of information on the images thereby facilitating the configuration of the electronic circuit while maintaining distance recognition precision. It will be noted that a contour corresponds to a pixel of an image line where the change in luminous intensity is maximum compared to its neighbouring pixels situated on the same line (such as for example the edge of a white strip of a pedestrian crossing). The image sub-zones are two-dimensional zones (for example squares of 5×5 pixels of a same line).

Advantageously, the third camera is arranged at a predetermined distance from the first camera, said predetermined distance being configured so that each first element in the first image is associated with a single third element in the third image. For example, it is advantageous that the third camera is situated at 1 cm, or even less, from the first camera.

This facilitates the establishment of correspondences between the contours of the images captured by the near cameras.

It will be noted that the quotient of the distance between the first and third cameras on the distance between the first and second cameras may be smaller than or equal to around one fifth. This optimises the ratio between the simplicity and the precision of the device.

Advantageously, the first, second and third cameras are arranged in a co-linear manner and the electronic circuit is configured to compare the first, second and third contours belonging respectively to the first, second and third images in an independent manner and line by line.

In an alternative, the first, second and third cameras are aligned and are configured to capture the first, second and third images unidimensionally. Thus, it suffices to have a single 1D image bar (i.e. a line of pixels).

Advantageously, the electronic circuit is configured to:
  extract the first, second and third elements belonging to a same horizontal line on the first, second and third images,
  establish an application between the first elements and the third elements by associating for each first element a single corresponding third element comprised in a reduced intermediate search zone belonging to the third image, and
  establish said stereoscopic correspondence between the first elements and the second elements by associating for the single third element comprised in the corresponding reduced intermediate search zone a single corresponding second element comprised in a second search zone belonging to the second image, said second search zone being able to contain several contours.

This makes it possible to eliminate uncertainties of relationships between the contents of the first and second images.

According to a preferred embodiment of the present invention, said first, second and third elements are first, second and third contours respectively.

According to this embodiment, the electronic circuit comprises:
contrast extraction filters configured to carry out a convolution on a same line of each of the first, second and third images thereby forming first, second and third contrast curves on said same line of first, second and third images,
thresholding filters configured to carry out thresholdings on said first, second and third contrast curves thereby forming first, second and third contours respectively,
encoders configured to carry out an encoding on said first, second and third contours thereby forming first, second and third discrete levels respectively, and
a circuit of (basic) electronic components configured to:
determine a first pixel shift between the position of each first contour and that of the corresponding third contour thereby defining said application between the first contours and the third contours,
determine a second pixel shift between the position of each first contour and that of the corresponding second contour thereby defining said stereoscopic correspondence between the first contours and the second contours, and
estimate the distance of an object as a function of the second pixel shifts between the positions of the first contours and those of the second contours representing said object.

Thus, the device comprises very simple electronic operations that are summed up in basic operations on individual pixels of a line of the image without even searching for shapes in all of the pixels of the complete 2D image.

Advantageously, the electronic circuit comprises an alert mechanism configured to signal any object as soon as its distance with respect to the cameras begins to reach a predetermined lower limit.

Advantageously, the first, second and third cameras are visible light cameras or infrared cameras. This enables the device to operate in a luminous or dark environment.

Advantageously, the device comprises a pattern projector configured to project repetitive patterns facing the first, second and third cameras, said repetitive patterns having a spacing greater than that between the first and third cameras.

Advantageously, the electronic circuit further comprises a processor configured to carry out a rectification of the images before carrying out the distance recognition.

This makes it possible to correct potential alignment problems between the different images.

Advantageously, the processor is further configured to carry out a shape recognition on image zones identified according to a single distance.

Advantageously, the processor may also be configured to process the elements corresponding to image segments or rectangular image sub-zones by making them more discernible or more relevant.

Advantageously, the processor is configured to estimate an approximate distance on an image without contours by linking up pixels having an identical luminous intensity.

According to another embodiment of the invention, the device further comprises a series of additional guiding cameras arranged according to increasing gaps going from the first camera to the third guiding camera.

This makes it possible to use cameras with a very high number of pixels and to work in zones with very close contours.

According to a particular embodiment, the device comprises an additional guiding camera, the gap between the first camera and the third camera being around one fifth of that between the first camera and the second camera, and the gap between the first camera and the additional guiding camera being around a twenty fifth of that between the first camera and the second camera.

According to yet another embodiment of the invention, the device comprises a plurality of other cameras arranged along different directions with respect to the co-linear arrangement of the first, second and third cameras.

Advantageously, the device comprises fourth and fifth cameras spaced apart by a predetermined distance and mounted perpendicularly with respect to the co-linear arrangement of the first, second and third cameras, the fourth camera being arranged near to the first camera, said first, second, third, fourth and fifth cameras being configured to acquire images simultaneously.

The invention also relates to a mobile system comprising the device according to any of the preceding claims.

Thus, the mobile system (example vehicle, flying object, drone) equipped with this device is capable of recognising obstacles in real time and of having an overview of the environment without using very ponderous computations.

The invention also relates to a method for recognising distance in real time using first and second cameras, and comprising the following steps:
arranging a third camera near to the first camera, said first, second and third cameras being configured to acquire simultaneously first, second and third images respectively, and
estimating the distance of an object as a function of a stereoscopic correspondence established between the first and second elements representative of said object and belonging to the first and second images respectively, said stereoscopic correspondence being established by taking into account a relationship between said first elements and corresponding third elements belonging to the third image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B illustrates a luminous intensity curve used in the method of FIG. 4A, according to an embodiment of the invention;

FIG. 4C illustrates a contrast curve used in the method of FIG. 4A, according to the invention;

FIG. 4H is a thresholded waveform used in the method of FIG. 4A, according to an embodiment of the invention;

FIG. 4I is a discretized waveform generated by the method of FIG. 4A, according to an embodiment of the invention;

FIG. 4J is another discretized waveform generated by the method of FIG. 4A, according to an embodiment of the invention;

DETAILED DESCRIPTION OF PARTICULAR EMBODIMENTS

The basic concept of the invention consists in adding an additional camera very close to one of the two cameras of a conventional stereovision system while using a basic electronic circuit of low electrical consumption to determine the distance of an object. The electronic circuit is a hardware circuit of logic gates which makes it possible to reduce the electrical consumption 10 to 100 times with respect to that of a device of the prior art which uses a lot of complex algorithms to avoid false correspondences.

Figure 1:
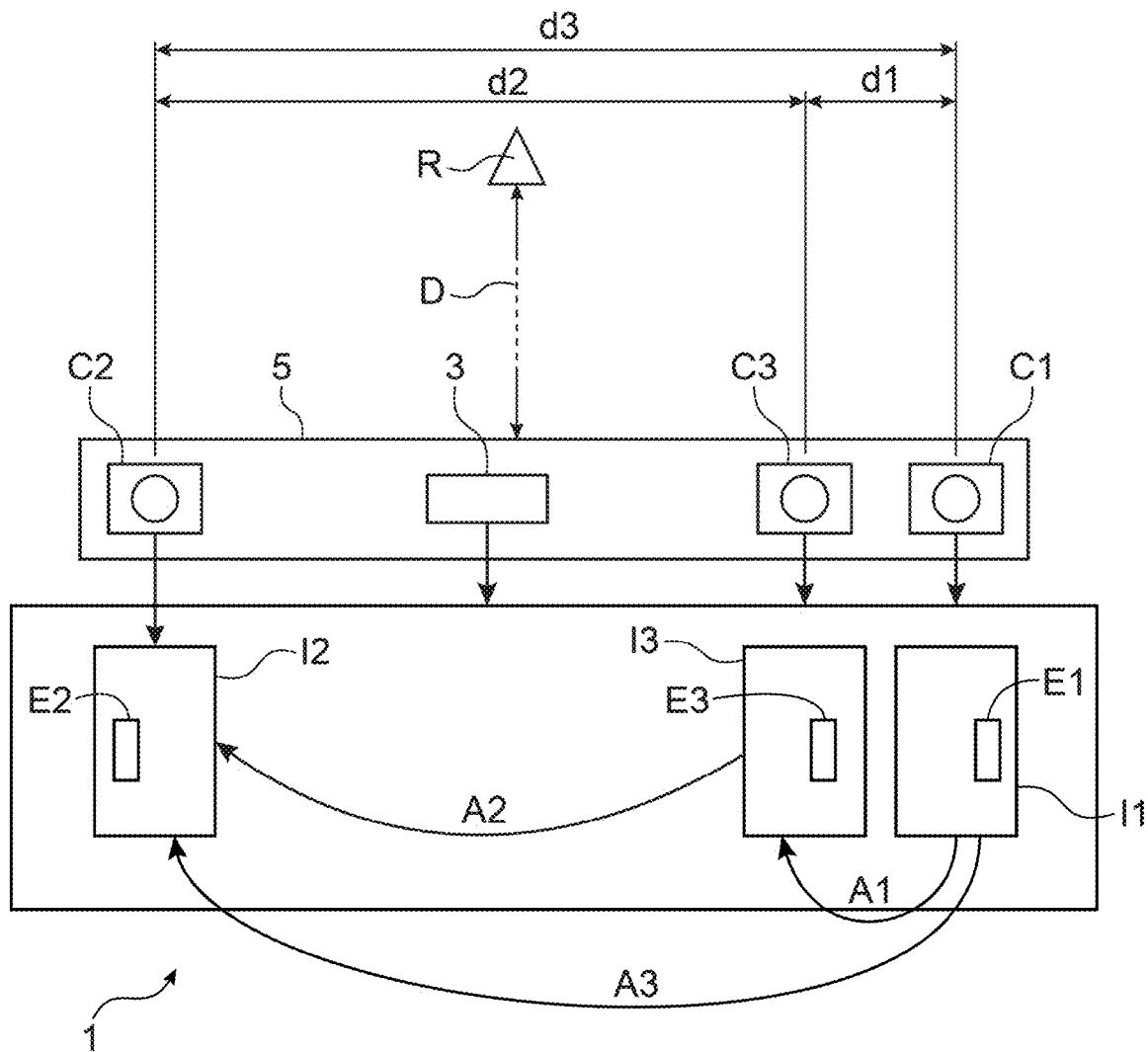
FIG. 1 schematically illustrates a device for recognising distance in real time, according to an embodiment of the invention.

FIG. 1 schematically illustrates a device for recognising distance in real time, according to an embodiment of the invention. FIG. 1 also illustrates a method for recognising distance in real time, according to an embodiment of the invention.

The distance recognition device 1 comprises first C1, second C2 and third C3 cameras as well as an electronic circuit 3.

The first C1, second C2 and third C3 cameras are mounted on a support 5 and are laid out to acquire simultaneously first I1, second I2 and third I3 images respectively. Advantageously, the cameras C1, C2, C3 supply digital images I1, I2, I3 composed of a determined number of pixels defining the resolution of the images.

The third camera C3 is a guiding camera situated between the two cameras C1 and C2 and, more specifically, arranged very close to one of them. According to this example, the third camera C3 is arranged near the first camera C1. Thus, the distance d1 separating the first camera C1 from the third camera C3 is less than the distance d2 separating the second camera C2 from the third camera C3. For example, the distance d1 is five to ten times smaller than the distance d2.

The fact that the first C1 and third C3 cameras are very close means that the images I1 and I3 that they capture are very similar to within a small shift of several pixels, the shift being linked to the distance of the observed object. This shift is of zero pixels if the object is at infinity and of the order of several pixel units to several tens of pixels (depending on the resolution of the image) if it is very near to the cameras C1, C2, C3. This small shift delimits the search for correspondence between shapes contained in the two images I1 and I3 to a small search zone. This makes it possible to very easily link the corresponding shapes of these two images I1 and I3.

It will be noted that the pixel shift between the images I1 and I2 captured by the extreme cameras (i.e. first C1 and second C2 cameras) is greater than that between the images I1 and I3 captured by the near cameras (i.e. first C1 and third C3 cameras) by a factor that depends on the quotient between the distance d3 of the extreme cameras C1, C2 and the distance d1 between the near cameras C1, C3.

Advantageously, the quotient between the distance d1 separating the first C1 and third C3 cameras on the distance d3 separating the first C1 and second C2 cameras is less than or equal to around a fifth. For example, in the case where this quotient is equal to a sixth (i.e. the distance between C1 and C2 is six times greater than that between C1 and C3), then a shift of "120" pixels between shapes contained in the first I1 and second I2 images (having a resolution of several hundreds of pixels) results in a shift of only "20" pixels between corresponding shapes contained in the first I1 and third I3 images. It will be noted that a large shift ("120" pixels on a resolution of only several hundred pixels) may create an uncertainty on the matching of shapes contained in the first I1 and second I2 images and notably for repetitive shapes such as a grid or foliage. However a shift of only "20" pixels makes it possible to elaborate a precise correspondence between the shapes contained in the first I1 and third I3 images. Thus, the third camera C3 plays a guiding role which facilitates the determination of a correspondence relationship between the shapes contained in the images I1 and I2 of the extreme cameras C1 and C2.

Moreover, the electronic circuit 3 is configured to establish a stereoscopic correspondence between the first E1 and second E2 elements belonging to the first I1 and second I2 images respectively by taking into account a correspondence relationship between the first elements E1 and equivalent third elements E3 belonging to the third image I3.

Advantageously, the third camera C3 is situated at a predetermined (for example, 1 cm) distance d1 from the first camera C1 such that a first element E1 in the first image is associated with a single third element E3 in the third image.

It will be noted that the elements E1, E2 and E3 may be contours, image segments or image sub-zones, for example image sub-zones each having a rectangular shape. The contours correspond to the edges of the objects represented in the images whereas the image segments or sub-zones correspond to geometric shapes of rectangular, square type or other shapes, comprising a determined number of pixels (for example, squares of 5×5 pixels).

To construct the stereoscopic correspondence A3 between the first E1 and second E2 elements belonging to the first I1 and second I2 images, the electronic circuit 3 is configured to compose two applications. A first application A1 is established between the first elements E1 belonging to the first image I1 and the corresponding third elements E3 belonging to the third image I3. A second application A2 is established between the third elements E3 belonging to the third image I3 and the corresponding second elements E2 belonging to the second image I2. The images (in the mathematical sense of the term, that is to say, the results) of the first application A1 are used as arguments for the second application A2.

Thus, the accuracy of the correspondence relationship between the first I1 and third I3 images established by the application A1 enables the electronic circuit 3 to estimate with precision the distance D of an object R with respect to the device 1 as a function of the stereoscopic correspondence A3 between first E1 and second E2 elements representative of the object and belonging respectively to the first I1 and second I2 images.

It will be noted that a conventional stereoscopic measurement technique may be used by the electronic circuit 3 to estimate the distance of an object as a function of the pixel gap between the first E1 and second E2 elements representative of the object. A conventional stereoscopic measurement algorithm is for example the FW (Fixed Window) method according to a cost aggregation strategy. Such a method is described in the document of Stephano Mattocia entitled "Stereo Vision: Algorithms and Applications". The operating defects of this conventional method are resolved by a reduced search zone thanks to the third camera according to the present invention.

Advantageously, the resulting image is displayed on an interface and the different distances D of the different objects with respect to the device 1 may be represented on the resulting image according to a different colour scale as represented in FIG. 2.

Figure 2A:
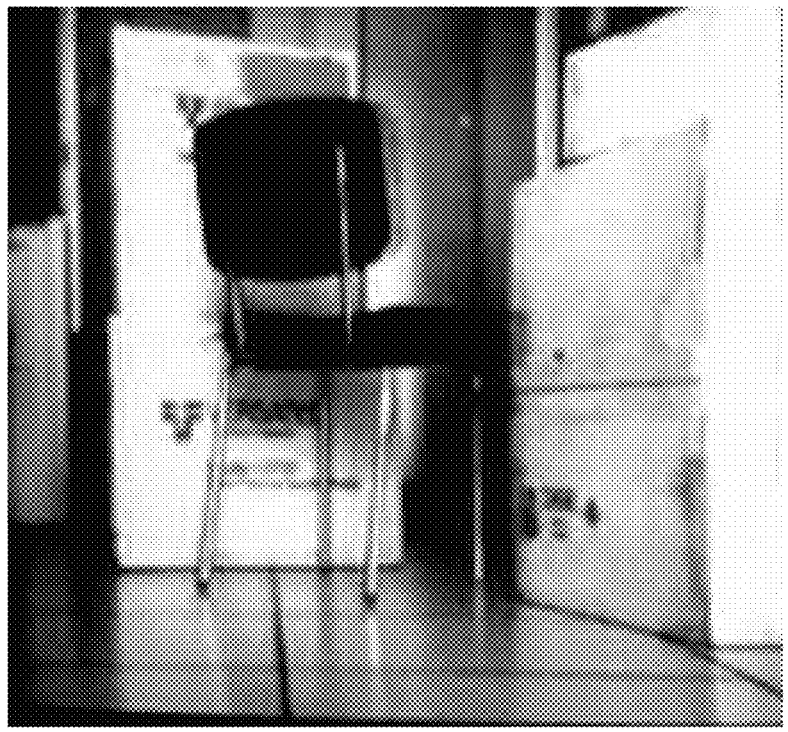
FIG. 2A illustrates an image taken by the recognition device, according to the invention.
Figure 2B:
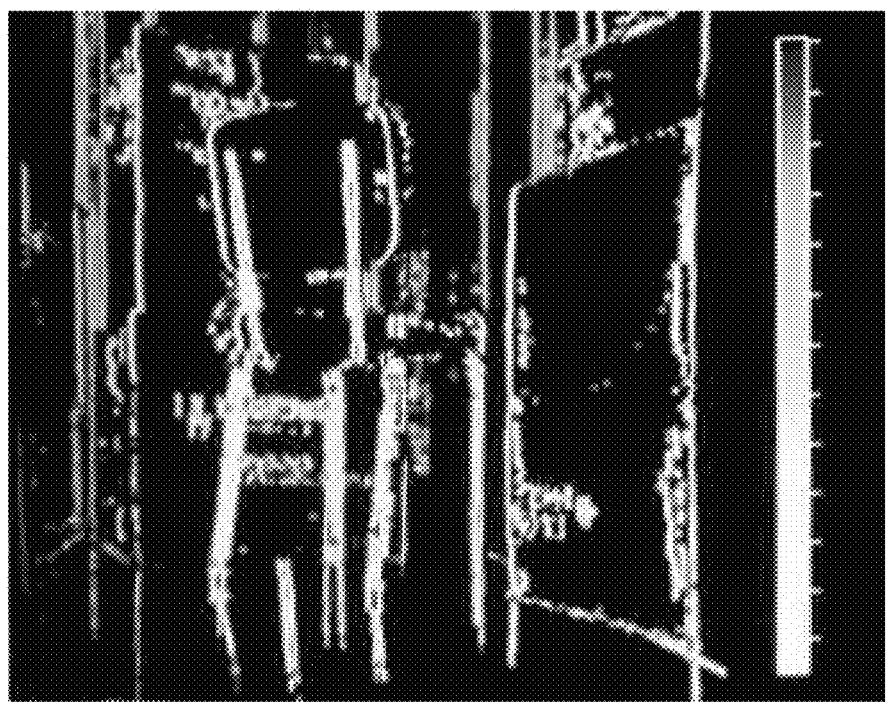
FIG. 2B illustrates a representation of the image taken by the recognition device, according to the invention.
Figure 2C:
FIG. 2C illustrates another image taken by the recognition device, according to the invention.
Figure 2D:
FIG. 2D illustrates a representation of the other image taken by the recognition device, according to the invention.

Indeed, FIGS. 2A and 2C illustrate images taken by the recognition device 1 and their representations are illustrated in FIGS. 2B and 2D, respectively. The representations illustrated in FIGS. 2B and 2D model the distances of the different elements determined by the electronic circuit 3 according to a colour scale. The right hand scale indicates the correspondence between the luminosity of the contour and its distance, the lightest/most luminous colour being representative of a contour of the object situated at the smallest distance from the device 1.

Figure 3:
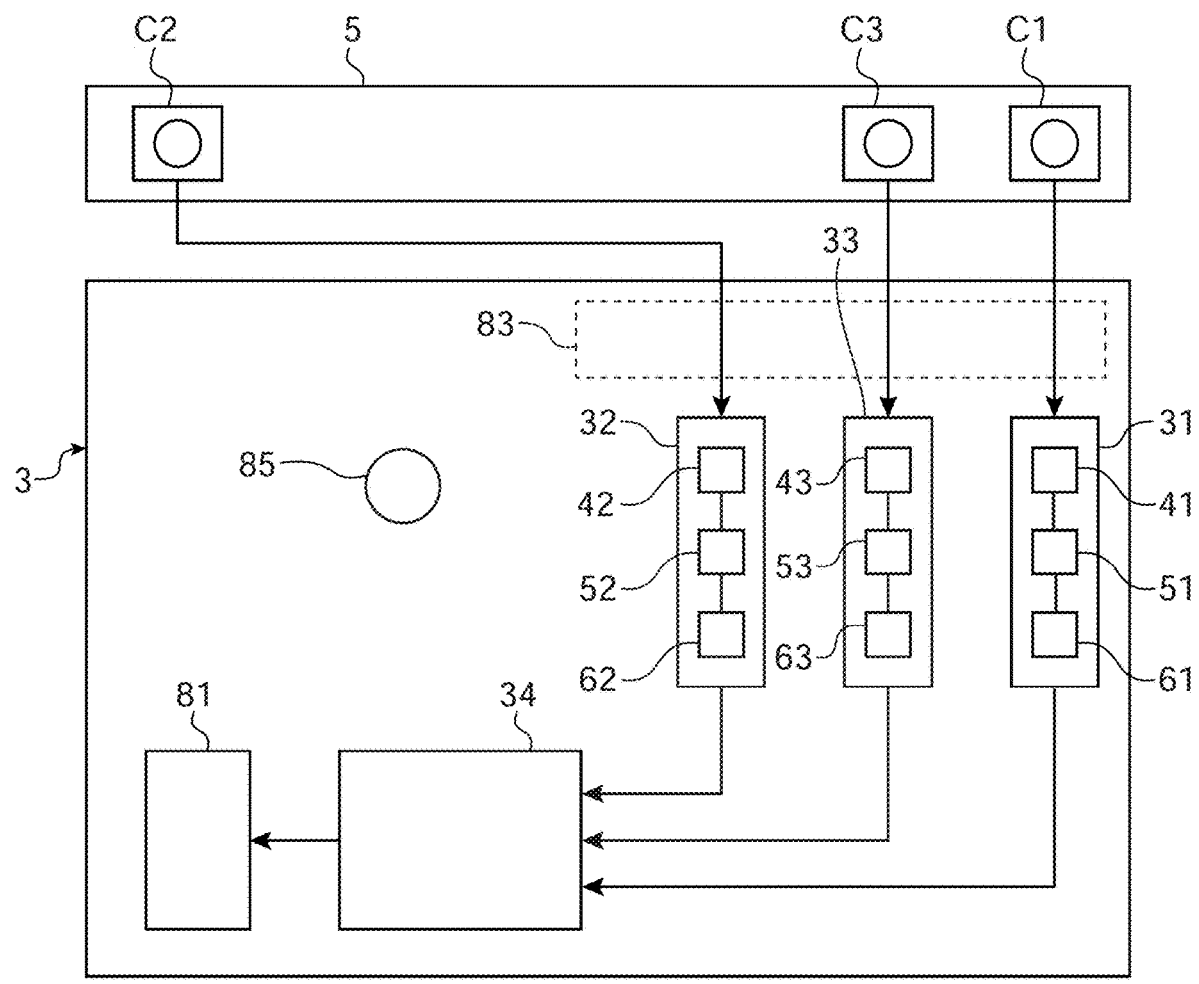
FIG. 3 schematically illustrates a device for recognising distance in real time, according to a preferred embodiment of the invention.

FIG. 3 schematically illustrates an example of a device for recognising distance in real time, according to a preferred embodiment of the invention.

The distance recognition device 1 comprises first C1, second C2 and third C3 cameras mounted on a support 5, taking for example the shape of a guide strip. The first C1 and second C2 cameras are mounted on the ends of the guide strip 5 whereas the third camera C3 is mounted nearer the first camera C1 than the second camera C2. Advantageously, the first C1, second C2 and third C3 cameras may be digital visible light or infrared cameras. It will furthermore be noted that these cameras may quite simply be sensors aligned and configured to capture first, second and third unidimensional images.

The recognition device 1 also comprises an electronic circuit 3 including first 31, second 32 and third 33 encoding devices connected to the first C1, second C2 and third C3 cameras respectively as well as a wiring circuit 34 including basic electronic components. The encoding devices 31, 32, 33 are suited to reducing electronic noise, to searching for contours and to eliminating very poorly marked contours. Each of the encoding devices 31, 32, 33 comprises a contrast extraction filter 41, 42, 43, a thresholding filter 51, 52, 53 and an encoder 61, 62, 63.

According to this example, the distance d3 between the first C1 and second C2 cameras is chosen to be around six times greater than the distance d1 between the first C1 and third C3 cameras. This latter distance d1 may be of the order of several centimetres, for example of the order of one to five centimetres. The digital resolution of the cameras may be of the order of several hundreds to several tens of thousands of pixels. The objectives of the three cameras C1, C2 and C3 are co-linear and, consequently, an element representing an object at infinity bears the same number of pixels on the three images. However, the shift with respect to the first image of an element, taken by the first camera C1, representing a close object will be around six times greater on the second image than on the third image.

FIGS. 4A-4J schematically illustrate a preferred embodiment of a method for recognising distance in real time, according to the device of FIG. 3.

Figure 4A:
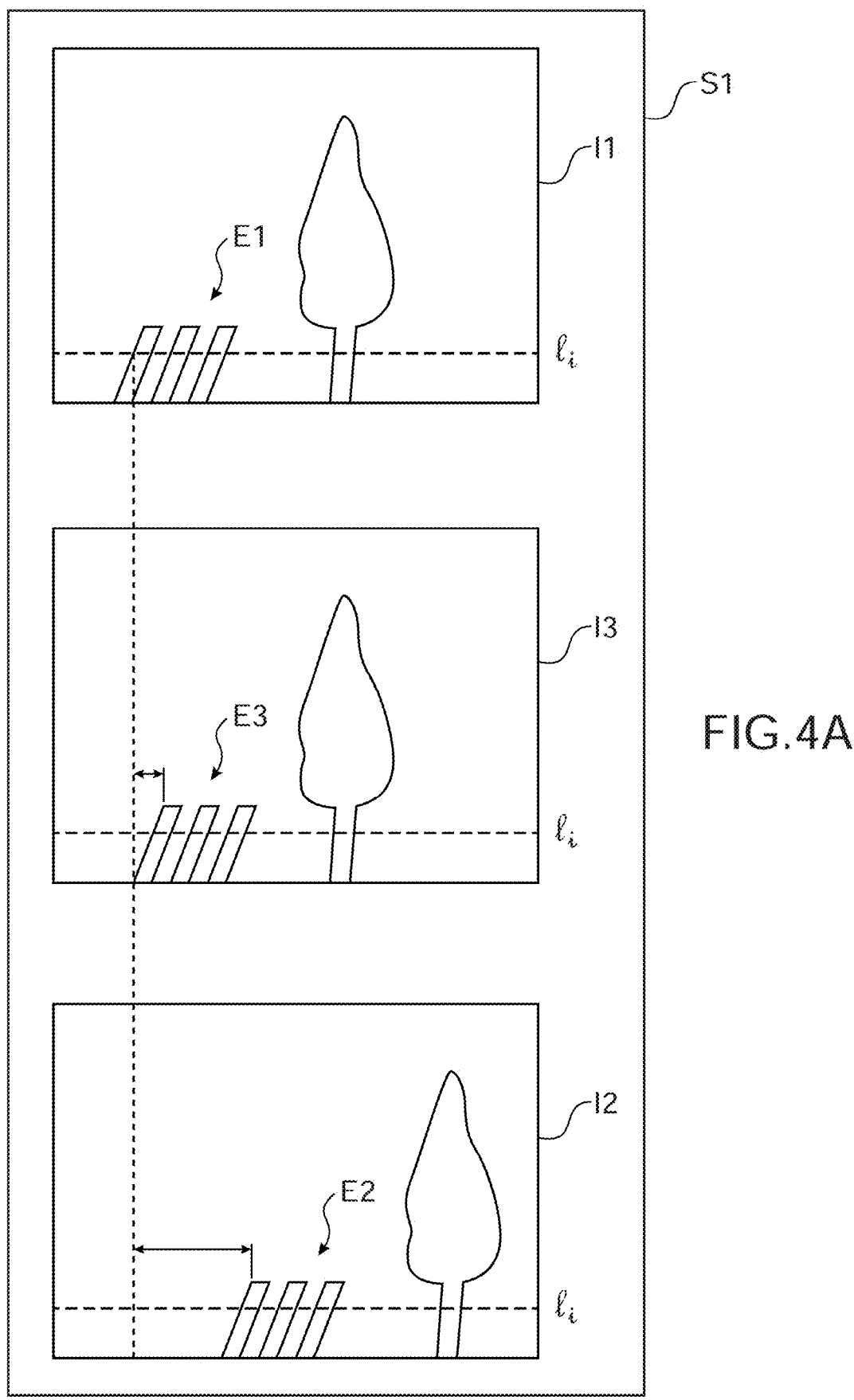
FIG. 4A schematically illustrates a method for recognising distance in real time, according to an embodiment of the invention.
Figure 4E:
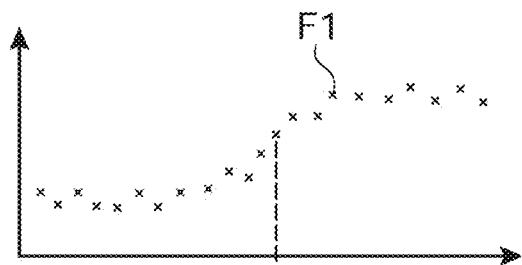
FIG. 4E is a covariance curve applied a first of the curves illustrated in FIG. 4D, according to an embodiment of the invention.
Figure 4E:
Figure 4F:
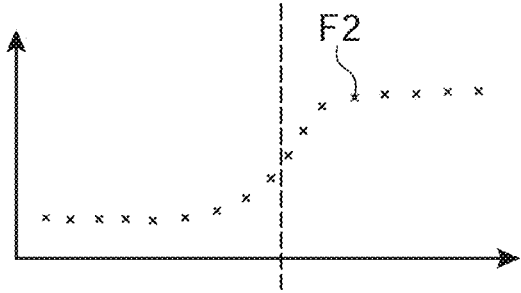
FIG. 4F is another covariance curve applied to a second of the curves illustrated in FIG. 4D.
Figure 4F:
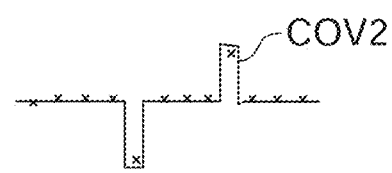

Step S1 concerns the taking of the first, second and third images by the first C1, second C2 and third C3 cameras respectively at a same instant. Indeed, FIG. 4A illustrates as an example and schematically first I1, second I2 and third I3 images taken simultaneously by the three cameras C1, C2, C3 on which are represented first E1, second E2 and third E3 elements shifted with respect to each other. According to this example, the elements correspond to images of objects such as a pedestrian crossing and a tree (see also FIG. 2C).

At steps S2-S5, the electronic circuit 3 is configured to extract from the first I1, second I2 and third I3 images first, second and third contours respectively. Thus, according to this embodiment, the elements are contours which represent the edges of objects.

Advantageously, the electronic circuit 3 is configured to analyse the first I1, second I2 and third I3 images line by line. Thus, at step S2 a same horizontal line number 1, is selected on the three images I1, I2, I3 (see FIG. 4A). For example, firstly, it is the first line of pixels, situated the lowest, of the images that is selected. Step S2 is represented in FIG. 4B which illustrates a curve of the luminous intensity as a function of the pixel number on the selected horizontal line $l_1$. For example, the first pixel is that situated the most to the left of the line of pixels. For reasons of simplification, only the curve relative to the first image is illustrated in FIG. 4B.

Figure 4D:
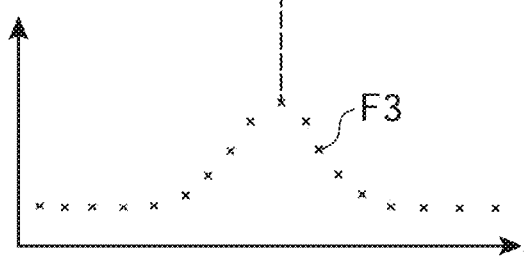
FIG. 4D illustrates curves used in the method of FIG. 4A, according to an embodiment of the invention.
Figure 4G:
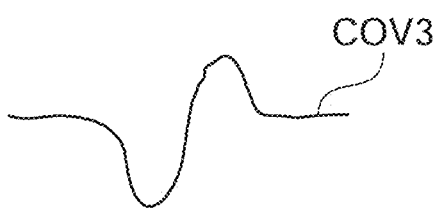
FIG. 4G is a further covariance curve applied to a third of the curves illustrated in FIG. 4D.

At step S3, the contrast extraction filters 41, 42, 43 are configured to carry out a convolution on the same line 1, of each of the first I1, second I2 and third I3 images thereby forming corresponding first, second and third contrast curves CS1. FIG. 4C illustrates as an example the first contrast curves CS1 belonging to the first image I1. Moreover, the contrast curve extraction technique is illustrated in greater detail in FIGS. 4D-4G. The first graph of FIG. 4D illustrates an initial curve F1 representing the luminous intensity of a part of a line as a function of the number of pixels. This corresponds for example to a zone of the graph illustrated in FIG. 4B of step S2. In order to smooth the initial curve, a first convolution COV1 (FIG. 4E) is applied to this initial curve F1 using a Gaussian type low pass filter thereby forming a smoothed curve F2 illustrated in the second graph.

Next, the position of a change of contrast (i.e. contour position) is determined by computing the slope between two points sufficiently spaced apart. This may be done by applying a second convolution COV2 (FIG. 4F) to the smoothed curve F2 forming a contrast curve F3. As an example, Dirac functions are used to estimate the position of each contour.

In an alternative, the first and second convolutions may be grouped together into a single convolution COV3 (FIG. 4G) using for example a wavelet of sinusoidal shape. It will be noted that the convolution consists in applying in a known manner a matrix of coefficients to a window comprising a given pixel and its neighbours then sliding this window over the whole image.

At step S4, the thresholding filters 51, 52, 53 are configured to carry out thresholdings on the first, second and third contrast curves CS1 according to a predetermined rejection threshold S (see FIG. 4C). This rejection threshold S makes it possible to eliminate noise and small variations. The resulting first, second and third contrast curves (hereafter called first, second and third contours or peaks P) have good contrast definition. The result of step S4 is illustrated as an example in FIG. 4H which shows the first resulting contours (or peaks) P of the first image I1.

At step S5, the encoders 61, 62, 63 are configured to carry out a discrete encoding according to three output levels "−1", "0" or "1" on the first, second and third contours forming respectively first, second and third discrete levels N (see FIGS. 4I-4J). More specifically, the level "−1" is attributed to the negative peaks, the level "1" is attributed to the positive peaks and finally, the level "0" is attributed to the intervals between the peaks.

In an alternative, the first, second and third contours are encoded in a binary manner according to two values "0" or "1" by taking quite simply the absolute value of the three preceding levels. Thus, the value "1" is attributed to both the positive peaks and to the negative peaks whereas the value "0" is as previously attributed to the intervals between the peaks. The two alternatives of step S5 are illustrated in FIGS. 4I-4J. The discrete (−1, 0, 1) or binary (0, 1) values designate contours or peaks and consequently, the terms "discrete value" and "contour" are quite simply merged hereafter.

At steps S6-S8, the wiring circuit 34 is configured to compare the positions of the different contours P on the three images in order to determine a correspondence between the contours P on the first I1 and second I2 images using the third image I3. This correspondence is carried out from the discrete levels received line by line and pixel by pixel from the first 31, second 32 and third 33 encoding devices connected to the first C1, second C2 and third C3 cameras respectively. This correspondence next makes it possible to estimate the distance of the object.

Figure 5:
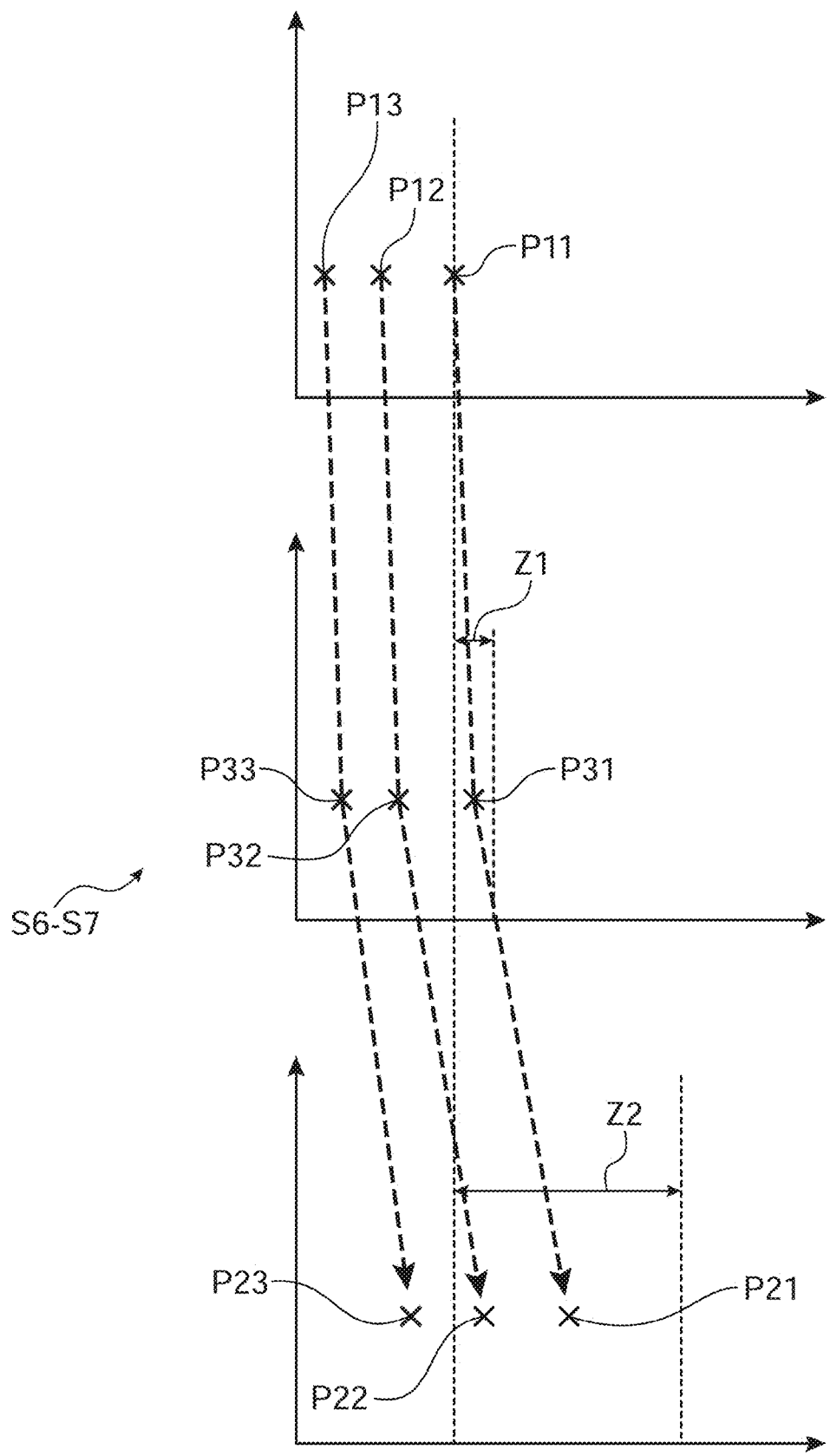
FIG. 5 schematically illustrates first, second and third encoded contours shifted with respect to each other and derived from the first, second and third images taken simultaneously by the three cameras, according to an embodiment of the invention.

In order to explain steps S6-S8, FIG. 5 schematically illustrates first, second and third encoded contours shifted with respect to each other and derived from the first, second and third images taken simultaneously by the three cameras, according to an embodiment of the invention. It will be recalled that an encoded contour represents the steepest slope of change of intensity between for example the grey of the tar and the white of the pedestrian crossing. It will furthermore be noted that the contours in FIG. 5 may represent elements according to the present invention (i.e. contours, image segments or sub-zones).

The first contours P11-P13 derived from the first image I1, the second contours P21-P23 derived from the second image I2, and the third contours P31-P33 derived from the third image I3 are shifted with respect to each other but represent a same image element E1, E2, E3 of the same close object taken according to different viewpoints at a same instant. A first contour P11 on the first image I1 is associated with a corresponding third contour P31 which may be found in an intermediate search zone (designated guiding zone) Z1 of the third image I3. The second contour P21 on the second image I2 corresponding to this first contour P11 is to be searched for in a large correspondence search zone Z2. The description relative to the search zones Z1, Z2 will be detailed hereafter in the description.

According to this example, the large correspondence search zone Z2 in the second image I2 comprises two distinct second contours P21 and P22 consequently being able to induce uncertainty on the choice of the second contour. However, the guiding zone Z1 of the third image I3 only comprises a single third contour P31 which makes it possible to establish a precise correspondence with the first contour P11 associated with the first image I1 and by composition of correspondences to correctly determine the corresponding second contour P21. Thus, thanks to a reduced extent of the guiding zone Z1, the electronic circuit 3 can establish a precise stereoscopic correspondence between the first I1 and second I2 images.

Indeed, at step S6, the wiring circuit 34 is configured to establish an application between the first contours P11-P13 and the third contours P31-P33 by associating for each first contour a single corresponding third contour comprised in an intermediate search zone Z1 belonging to the third image I3. More specifically, the wiring circuit 34 establishes this application by determining a first pixel shift between the position of each first contour P11-P13 and that of the corresponding third contour P31-P33.

At step S7, the wiring circuit 34 is configured to establish the stereoscopic correspondence between the first contours P11-P13 and the second contours P21-P23. The single third contour P31 comprised in the corresponding intermediate search zone Z1 is associated with a single corresponding second contour P21 comprised in a second search zone Z2 belonging to the second image I2.

More specifically, the wiring circuit 34 establishes the stereoscopic correspondence by determining a second pixel shift between the position of each third contour P31-P33 and that of the corresponding second contour P21-P23. This relationship corresponds to the second application between the third contours and the second contours.

At step S8, the wiring circuit 34 is configured to estimate the distance of an object with respect to the device 1 as a function of the second pixel shifts between the positions of the first contours P11-P13 and those of the second contours P21-P23 representing the object in question. The estimation of the distance results from a predetermined correspondence between distance values in centimetres or in metres and the shift in number of pixels. This predetermined correspondence depends on the focal distance of the objectives of the cameras and the density of the pixels. For example, if a same object situated at 1 m from the device 1 is shifted by one hundred pixels between the first C1 and second C2 cameras, then at 2 m it would have been shifted by fifty pixels, and so on up to zero pixels if it is at infinity.

Steps S6-S8 are described in greater detail with reference to FIG. 6 in addition to FIG. 5.

Figure 6:
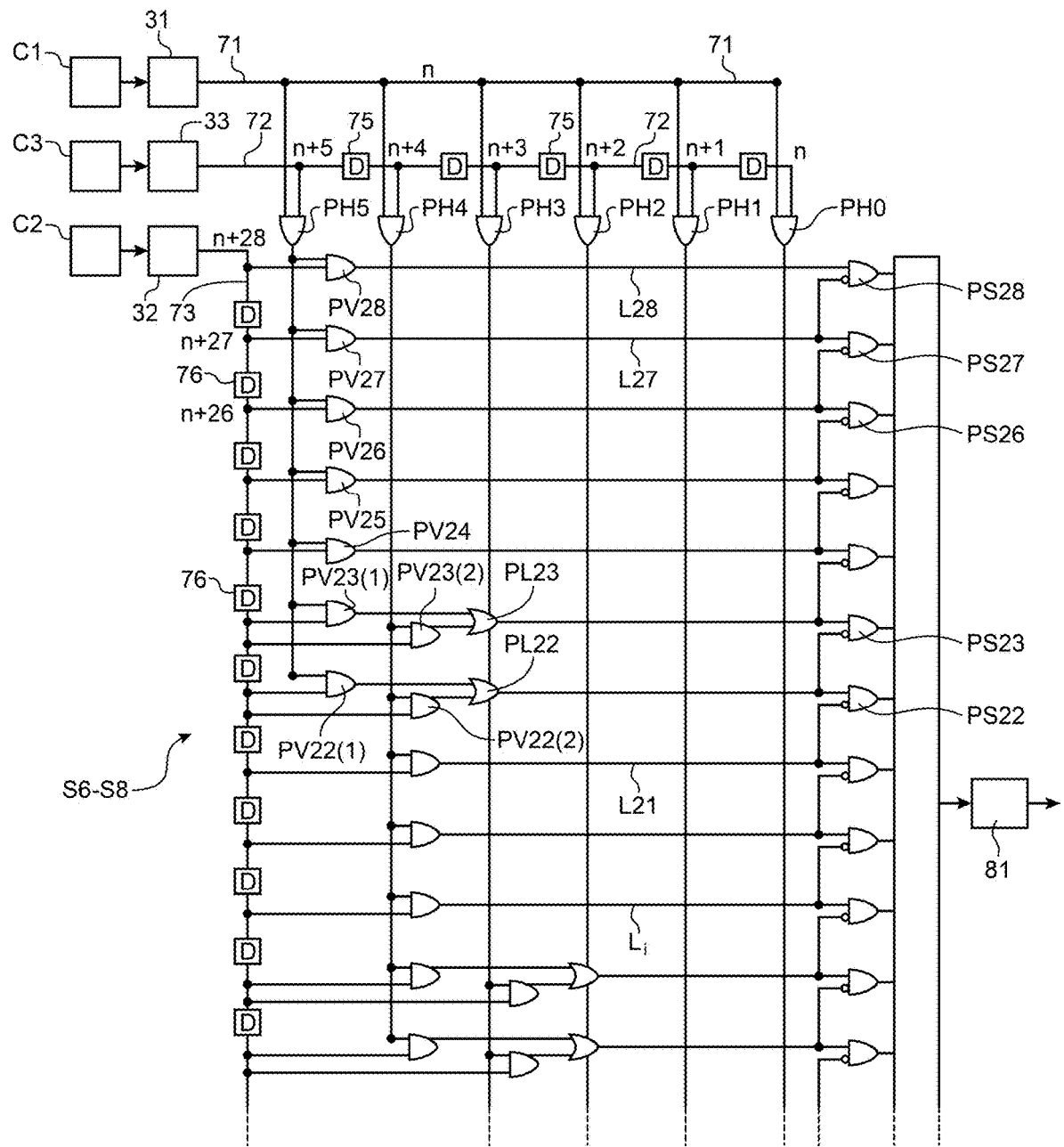
FIG. 6 schematically illustrates an electronic circuit according to a preferred embodiment of the invention.

Indeed, FIG. 6 schematically illustrates a more detailed electronic circuit according to a preferred embodiment of the invention.

In order to simplify the illustration of the electronic circuit, the resolution of the cameras C1, C2, C3 is assumed to be of the order of only several hundreds of pixels. Moreover, the distance d1 between the first C1 and third C3 cameras is chosen quite small so that a very close object (for example at 1 m from the cameras), only has at the most a shift of six pixels between the contours representing them on the first I1 and third I3 images knowing that an object at infinity does not have any shift between the two images. It will be noted that the shift number also depends on the minimum contour recognition distance (for example at 1 m from the camera) and on the resolution of the image in addition to the distance between the two cameras. As an example, the distance between the first C1 and third C3 cameras is of the order of 5 cm and that between the first C1 and the second C2 camera is of the order of 30 cm. This enables the recognition device 1 to recognise objects between 1 m and infinity.

With reference to FIG. 5, it is assumed that a first contour P11 is referenced by a pixel number "n" on the first image I1. The third contour P31 corresponding to this pixel "n" is found in the guiding zone Z1 of the third image I3 defined by an interval $I_1$=[n, n+5]. For a distance between the first C1 and second C2 cameras six times larger than that between the first C1 and third C3 cameras, the shift number in the second image I2 may be comprised in an interval $I_2$=[n, n+28] representing the second search zone Z2. Here, the example is taken of a maximum shift for a close object, of five pixels between the first camera C1 and the third camera C3. Thus, even if the real shift would be 5.5 pixels, it is seen all the same with five pixels. The second camera C2, being five times further away than the third camera C3, should give the contour corresponding to the furthest with 27.5 pixels (i.e. 5 times 5.5 pixels). Consequently, the contour the most shifted between the first and second cameras C1, C2 will be with twenty eight pixels maximum. This makes it possible to cover the case where a contour situated between two pixels on the third camera C3 appears randomly either in n+i or in n+(i−1) thereby constantly guaranteeing the existence of a correspondence between the first and second cameras C1, C2.

Thus, according to this embodiment, the wiring circuit 34 illustrated in FIG. 6 comprises first 71 and second 72 horizontal wirings connected to the outputs of the first 31 and third 33 encoding devices respectively as well as a first vertical wiring 73 connected to the output of the second encoding device 32. The wiring of the circuit is described uniquely as an example and obviously may be configured differently by those skilled in the art.

The first 71 and second 72 horizontal wirings represent comparison lines between the images of the first C1 and third C3 cameras (i.e. the near cameras). Moreover, the outputs of this comparison are coupled to the first vertical wiring 73 to compare them with the image of the second camera C2.

At each tick of the clock, the first horizontal wiring 71 is configured to receive the level of a single pixel of the first image. This level is either a "1" representing a contour or a "0" representing the absence of contour. On the other hand, the second horizontal wiring 72 is configured to have already received the levels of five consecutive pixels of the third image I3 whereas the first vertical wiring 73 is configured to have already received the levels of twenty eight consecutive pixels of the second image I2. Thus, each clock tick relative to the first horizontal wiring 71 corresponds to the fifth and twenty eighth clock ticks respectively relative to the second horizontal wiring 72 and to the vertical wiring 73. Thus, when the level of the pixel numbered "n" of the first image I1, noted $p_1(n)$, is found on the first horizontal wiring 71, the levels of six pixels numbered from "n" to "n+5" of the third image I3, noted $p_3(n), \ldots, p_3(n+5)$ are found on the second horizontal wiring 72 and the levels of twenty nine pixels numbered "n" to "n+28" of the second image I2, noted $p_2(n), \ldots, p_2(n+28)$ are found on the vertical wiring 73.

Indeed, the second horizontal wiring 72 comprises five horizontal shift operators 75 (i.e. electronic shift elements or components) connected in series making it possible to have the values of six consecutive pixels of the third image I3. The level of the pixel $p_3(n)$ of the third image I3 is cascade shifted at each clock tick (relative to the second horizontal wire 72) by the horizontal shift operators 75 and is replaced by the level of the following pixel $p_3(n+1)$. In other words, the pixel that was on the left is displaced by the shift operator 75 to the right at each clock tick. Thus, the levels of six consecutive pixels $p_3(n), \ldots, p_3(n+5)$ are found on the second horizontal wiring 72 separated two by two in an alternating manner by each of the five shift operators 75.

Given that the guiding zone Z1 relative to the third camera C3 extends between the pixels $p_3(n), \ldots, p_3(n+5)$, then the value (1 or 0) of the pixel $p_1(n)$ (relative to the first image I1) on the first horizontal wiring 71 may thereby be compared with the values of the pixels $p_3(n), \ldots, p_3(n+5)$ (relative to the third image I3) on the horizontal second wiring 72. This comparison is carried out by six horizontal "AND" logic gates PH0, ..., PH5 coupling the first 71 and second 72 horizontal wirings. More specifically, the values of the pixels $p_1(n)$ and $p_3(n)$ are injected into the horizontal logic gate PH0, the values of the pixels $p_1(n)$ and $p_3(n+1)$ are injected into the horizontal logic gate PH1 and so on.

The shift between a contour P11 of the first image I1 and a corresponding contour P31 of the third image I3 is then determined by the rank of the logic gate which has an output value equal to "1". For example, if PHj=1, then it is known that the pixel shift between corresponding contours of the first and third images is equal to "j". This relationship between the first contours representative of an object of interest of the first image I1 and the corresponding third contours of the third image I3 forms a first application between these two images relative to this object of interest.

Furthermore, the first vertical wiring 73 comprises twenty eight vertical shift operators 76 connected in series making it possible to have the levels (1 or 0) of twenty nine consecutive pixels of the second image I2. The level of the pixel $p_2(n)$ of the selected line of the second image I2 is cascade shifted at each clock tick by the vertical shift operators 76 and is replaced by the level of the following pixel $p_2(n+1)$. In other words, the pixel which was on top is displaced downwards at each clock tick. Thus, the levels of twenty nine consecutive pixels $p_2(n), \ldots, p_2(n+28)$ are found on the vertical wiring 73 separated in a sequential and alternating manner by the twenty eight vertical shift operators 76.

Given that the second correspondence search zone Z2 relative to the second camera C2 extends between the pixels $p_2(n)$ and $p_2(n+28)$, then the output levels of these pixels are compared with the outputs of the six horizontal logic gates PH0, ..., PH5. More specifically, the levels of the pixels on the vertical wiring 73 are compared by packets with the output values of the horizontal logic gates PH0, ..., PH5. Advantageously, an overlap of two pixels is provided between two consecutive packets.

This comparison is carried out by vertical "AND" logic gates PV0, ..., PV28 coupling the vertical wiring 73 with the outputs of the horizontal logic gates PH0, ..., PH5. More specifically, according to this example, a first packet of seven pixels $p_2(n+28), \ldots, p_2(n+22)$ of the vertical wiring 73 is compared with the output of the horizontal logic gate PH5 through a first group of seven vertical logic gates PV28(1), ..., PV22(1). A second packet of seven pixels $p_2(n+23), \ldots, p_2(n+17)$ of the vertical wiring 73 is compared with the output of the horizontal logic gate PH4 through a second group of seven vertical logic gates PV23(2), ..., PV17(2) and so on. It will be noted that the levels of the pixels $p_2(n+22)$ and $p_2(n+23)$ are taken into account in the two comparisons. Indeed, according to this example, the twenty nine pixels $p_2(n), \ldots, p_2(n+28)$ are sub-divided into six packets of seven pixels each and with two overlaps of two pixels between each pair of adjacent packets. The overlap between two pixels makes it possible to take into account the case where a contour may be more or less defined between two adjacent pixels. In this case, the outputs of the vertical logic gates PV23(1) and PV23(2) are injected into an "OR" logic gate PL23 and similarly, the outputs of the vertical logic gates PV22(1) and PV22(2) are injected into another "OR" logic gate PL22. The overlap zone is chosen according to the ratio of distances between the two closest cameras.

Finally, twenty nine output lines L0, . . . , L28 are formed by the outputs of the vertical "AND" logic gates (in the zones of non-overlap) and the outputs of the "OR" logic gates indicating the shift between the first and second cameras. Indeed, if a contour is detected between the first and third images, there will only be a single output line among the twenty nine output lines L0, . . . , L28 which is going to have the level "1".

Thus, the shift value between a contour of the first image I1 and a corresponding contour of the second image I2 is determined by the rank of the output line Li which is found at level "1". For example, if Li=1, then it is known that the pixel shift between corresponding contours of the first I1 and second I2 images is equal to "i".

These comparisons thereby associate for each third contour comprised in the search guiding zone Z1 a single corresponding second contour comprised in the second search zone Z2 belonging to the second image I2 then determining the stereoscopic correspondence between the first contours and the second contours.

Advantageously, the wiring circuit 34 comprises a final column of output "AND" logic gates PS0, . . . , PS28 suited to validate the existence of a single correspondence between a contour on the first image I1 and a single contour on the second image I2.

These output "AND" logic gates PS0, . . . , PS28 are coupled to the output lines L0-L28 such that each output "AND" logic gate PSi receives the value borne by the output line Li as well as the inverse of the value borne by the preceding output line L(i−1). However, the first output "AND" logic gate PS0 receives the value "1" in addition to the value borne by the first output line L1.

In order to illustrate the operation of the wiring circuit 34, let us assume that the level of the pixel number "n" is equal to "1" (i.e. $p_1(n)=1$) signifying the presence of a contour at the position "n". Moreover, let us assume that the corresponding contour in the third image I3 is detected at the position "n+4" (i.e. $p_3(n+4)=1$). The values of the other pixels are thus at zero ($p_3(n)=p_3(n+1)=p_3(n+2)=p_3(n+3)=p_3(n+5)=0$) knowing that the distance between the first C1 and third C3 cameras is configured so that there is a single contour in the guiding zone Z1. Furthermore, let us assume that the first pixel having the value "1" in the second image I2 is the pixel number "21" (i.e. $p_2(17)=p_2(18)=p_2(19)=p_2(20)=0$ and $p_2(21)=1$, $p_2(22)=0$, $p_2(23)=0$) then the levels on the line L21 and all the other output lines Lx are equal to "1" and "0" respectively. The output logic gate PS21 is then found at the level "1" and consequently, the shift between the contour of the first image I1 and that corresponding of the second image I2 is equal to "21" and this remains valid even if another contour existed between $p_2(1)$ and $p_2(16)$ or between $p_2(24)$ and $p_2(28)$. It will be noted that it would have been necessary to recognise this other contour as not appropriate via a complex algorithm if the third guiding camera had not made it possible to consider it as non-significant.

Next, the distance is directly deduced from the shift value using a predetermined function (or a curve) of the distance as a function of the shift.

Advantageously, the electronic circuit 3 comprises an alert mechanism 81 (see FIG. 3 or FIG. 6) configured to signal any object of which the distance with respect to the cameras C1, C2, C3 begins to reach a predetermined lower limit. This lower limit may be configured depending on the type of application and may for example be equal to 50 cm or 1 m.

According to an embodiment, the distance recognition device 1 comprises a pattern projector 85 (see FIG. 3) configured to project repetitive patterns facing the three cameras C1, C2 and C3. The pattern projector 85 is for example a laser pointer with a kaleidoscopic tip. Furthermore, the projection may advantageously be carried out in the near infrared domain.

It will be noted that the spacing of the repetitive patterns is configured to be greater than that between the first camera and the third guiding camera. Thus, these artificial patterns are easily identified by the three cameras C1, C2 and C3 without any risk of correspondence error. This enables the recognition device 1 to gain further in performance on uniform zones (i.e. without marked contours) or in not very luminous zones. Here again, it will be noted that without the third guiding camera, the repetition of the patterns would have created numerous potential correspondences difficult to reject without resorting to a complex algorithm.

Advantageously, the electronic circuit 3 may also comprise a processor 83 (represented in dotted lines in FIG. 3) configured to carry out a potential rectification of the images so that a horizontal line is the same on the three images. In this case, the images at the output of the cameras C1, C2, C3 pass through the microprocessor which rectifies them before transmitting them to the encoding devices 31, 32, 33.

It will be noted that the mechanical mounting of the cameras on a rigid support (for example a guide strip) makes it possible to have an alignment on the images of the three cameras. However, in the case where the cameras are not calibrated or if the quality of their objectives is not optimal or if the mechanical mounting of the three cameras is not perfect, the lines of each camera may be at different levels or even not parallel. Thus, in order to correct this potential problem, the processor comprises a rectification software (known to those skilled in the art) to correct the alignment of the lines between the different images.

Furthermore, in the case where the elements extracted from the images are image segments or rectangular image sub-zones, the processor 83 is further advantageously configured to process the image segments or the rectangular image sub-zones by making them more discernible. This processing may be carried out in a known manner by weighting the pixels corresponding to these elements with greater weight, or by varying their colour or their luminosity, etc.

Advantageously, the processor 83 is further configured to estimate an approximate distance on an image zone without contours by linking pixels having an identical luminous intensity and situated in a distance zone (i.e. shift) identical to the surrounding contours already found.

The processor 83 may also be configured to fill the spaces between the contours of which the distances have been calculated. This may be carried out according to a known technique of continuity of distances between near pixels.

The processor 83 may also be configured to carry out a shape recognition on image zones identified according to a single distance by implementing known shape recognition software for example to identify persons.

Figure 7:
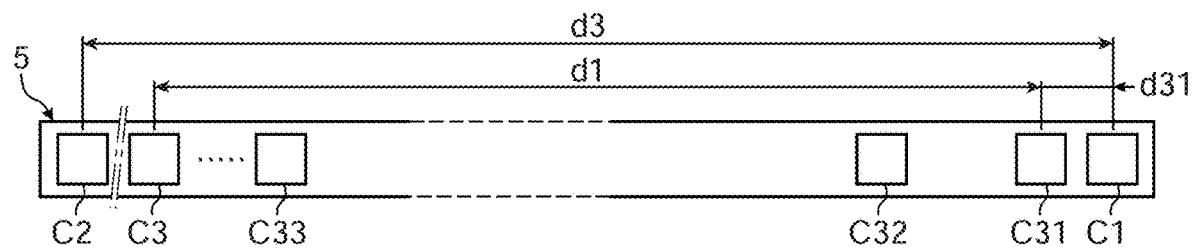
FIGS. 7 and 8 schematically illustrate devices for recognising distance in real time, according to other preferred embodiments of the invention.

FIG. 7 schematically illustrates a device for recognising distance in real time, according to preferred embodiment of the invention.

According to this embodiment, the distance recognition device 1 comprises a series of additional guiding cameras C31, C32, . . . , C33 arranged according to increasing gaps going from the first camera C1 to the third guiding camera C3. Thus, the gap between each additional camera and that which precedes it varies in an increasing manner.

This makes it possible to use cameras with a very high number of pixels (for example greater than or equal to 4000 pixels) enabling very precise measurement of distances. Moreover, this makes it possible to work easily in zones with very close contours (for example, tree foliage).

As an example, the distance recognition device 1 comprises a single additional guiding camera C31. Thus, the distance recognition device 1 comprises four cameras C1, C2, C3, C31. For example, the gap d1 between the first camera C1 and the third camera C3 may be around one fifth of that d3 between the first camera C1 and the second camera C2. In this case, the gap d31 between the first camera C1 and the additional guiding camera C31 may be around one twenty fifth of that d3 between the first camera C1 and the second camera C2.

To give numerical values, the distance between the first camera C1 and the additional guiding camera C31 may be equal to around 1 cm, the distance between the first camera C1 and the third guiding camera may be equal to around 5 cm, and finally, the distance between the first camera C1 and the second camera C2 may be equal to around 25 cm.

Figure 8:
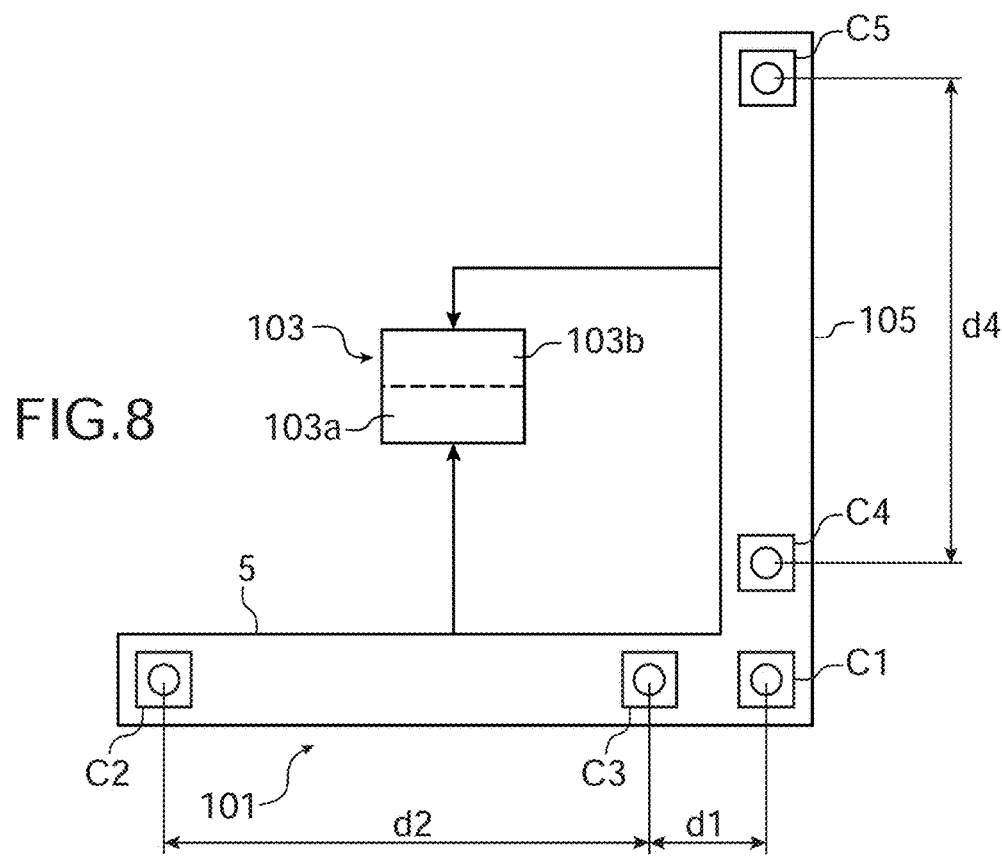

FIG. 8 schematically illustrates a device for recognising distance in real time, according to yet another preferred embodiment of the invention.

According to this other embodiment, the distance recognition device 101 comprises first C1, second C2, third C3, fourth C4 and fifth C5 cameras configured to acquire images simultaneously.

As previously, the first C1, second C2 and third C3 cameras are mounted in a co-linear manner on a support or a first guide strip 5. The third camera C3 is a guiding camera arranged nearer the first camera C1 than the second camera C2. However, the fourth C4 and fifth C5 cameras are mounted on a second guide strip 105 arranged perpendicularly to the first guide strip 5. The fourth C4 and fifth C5 cameras are spaced apart by a predetermined distance d4 and are perpendicular to the co-linear arrangement of the first C1, second C2 and third C3 cameras. The fourth camera C4 is a guiding camera arranged nearer the first camera C1 than the fifth camera C5 and plays the same role as the third camera C3. All of the first C1, fourth C4 and fifth C5 cameras are configured to detect horizontal contours whereas all of the first C1, second C2 and third C3 cameras are configured to detect vertical contours. This recognition device 101 enables good recognition of vertical and horizontal contours thereby further increasing the precision of distance measurements.

The recognition device 101 also comprises an electronic circuit 103 formed of first 103a and second 103b circuits each being equivalent to the circuit 3 described previously. Indeed, the first circuit 103a is associated with the first C1, second C2 and third C3 cameras to detect vertical contours whereas the second circuit 103b is associated with the first C1, fourth C4 and fifth C5 cameras to detect horizontal contours.

According to yet other embodiments, the recognition device 101 may comprise a plurality of cameras arranged along different directions with respect to the co-linear arrangement of the first, second and third cameras.

Figure 9:
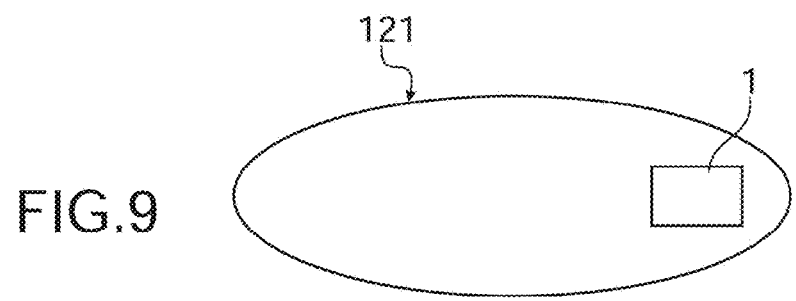
FIG. 9 schematically illustrates a mobile system comprising a distance recognition device, according to a preferred embodiment of the invention.

FIG. 9 schematically illustrates a mobile system comprising a distance recognition device 1, according to a preferred embodiment of the invention.

The mobile system 121 may be a terrestrial vehicle (car, lorry, train, etc.), maritime (boat, ship, etc.), an aircraft (airplane, helicopter, etc.) or a drone. By being equipped with a distance recognition device 1, the mobile system 121 is suited to recognise obstacles in real time and to have an overview of the environment without using very ponderous and costly computations in terms of computation time and electrical consumption.

The distance recognition device 1 may be mounted on the mobile system 121 along a direction selected from the following directions: parallel to the direction of gravity, perpendicular to the direction of gravity, or oblique with respect to the direction of gravity.

A direction parallel to the direction of gravity makes it possible to obtain distance information from the horizontal contours. A direction perpendicular to the direction of gravity makes it possible to obtain distance information from the vertical contours. Furthermore, an oblique direction with respect to the direction of gravity makes it possible to obtain distance information from the horizontal or vertical contours.

Advantageously, the mobile system 121 may comprise several distance recognition devices 1 mounted along several different directions. Furthermore, the mobile system 121 may be equipped with a distance recognition device 101 according to the embodiment of FIG. 7.

The invention claimed is:

1. A device for recognizing distance in real time, comprising:
    first and second cameras,
       a third camera arranged nearer the first camera than the second camera, the gap between the first camera and the third camera being smaller or equal to one fifth of that between the first camera and the second camera, said first, second and third cameras being collinearly arranged and being configured to acquire simultaneously first, second and third images respectively, and
    an electronic circuit configured to estimate a distance of an object as a function of a stereoscopic correspondence established between first and second elements representative of said object and belonging to the first and second images respectively, said stereoscopic correspondence being established by composing a first application between the first elements and corresponding third elements belonging to the third image and a second application between the third elements and the corresponding second elements, the results of the first application are used as arguments for the second application, the first, second and third elements including at least one of contours, image segments, and rectangular image sub-zones.

2. The device according to claim 1, wherein the electronic circuit is configured to extract from the first, second and third images said first, second and third elements.

3. The device according to claim 1, wherein the electronic circuit is configured to:
    extract the first, second and third elements belonging to a same horizontal line on the first, second and third images, establish an application between the first elements and the third elements by associating for each first element a single corresponding third element comprised in a reduced intermediate search zone belonging to the third image, establish said stereoscopic correspondence between the first elements and the second elements by associating for the single third element comprised in the corresponding reduced intermediate search zone a single corresponding second element comprised in a second search zone belonging to the second image.

4. The device according to claim 1, wherein said first, second and third elements are first, second and third contours respectively.

5. The device according to claim 4, wherein the electronic circuit comprises:

contrast extraction filters configured to carry out a convolution on a same line of each of the first, second and third images thereby forming first, second and third contrast curves on said same line of first, second and third images, thresholding filters configured to carry out thresholdings on said first, second and third contrast curves thereby forming the first, second and third contours respectively, encoders configured to carry out an encoding on said first, second and third contours thereby forming first, second and third discrete levels respectively, and a circuit of electronic components configured to:

determine a first pixel shift between the position of each first contour and that of the corresponding third contour thereby defining said application between the first contours and the third contours, determine a second pixel shift between the position of each first contour and that of the corresponding second contour thereby defining said stereoscopic correspondence between the first contours and the second contours, and estimate the distance of an object as a function of the second pixel shifts between the positions of the first contours and those of the second contours representing said object.

6. The device according to claim 1, wherein the electronic circuit is further configured to signal any object as soon as its distance with respect to the cameras begins to reach a predetermined lower limit.

7. The device according to claim 1, wherein the first, second and third cameras are visible light cameras or infrared cameras.

8. The device according to claim 1, further comprising a pattern projector configured to project repetitive patterns facing the first, second and third cameras, said repetitive patterns having a spacing greater than that between the first and third cameras.

9. The device according to claim 1, wherein the electronic circuit further comprises a processor configured to carry out a rectification of the images before carrying out the distance recognition.

10. The device according to claim 1, further comprising a series of additional guiding cameras arranged according to increasing gaps going from the first camera to the second guiding camera.

11. The device according to claim 10, further comprising an additional guiding camera, the gap between the first camera and the additional guiding camera being one twenty fifth of that between the first camera and the second camera.

12. The device according to claim 1, further comprising a plurality of other cameras arranged along different directions with respect to the co-linear arrangement of the first, second and third cameras.

13. The device according to claim 12, further comprising fourth and fifth cameras spaced apart by a predetermined distance and mounted perpendicularly with respect to the co-linear arrangement of the first, second and third cameras, the fourth camera being arranged near to the first camera, said first, second, third, fourth and fifth cameras being configured to acquire images simultaneously.

14. A mobile system comprising the device according to claim 1.

15. A method for recognizing distance in real time, comprising:

using first and second cameras, using a third camera situated nearer the first camera than the second camera, the gap between the first camera and the third camera being smaller or equal to one fifth of that between the first camera and the second camera, said first, second and third cameras being collinearly arranged and being configured to acquire simultaneously first, second and third images respectively, and estimating a distance of an object as a function of a stereoscopic correspondence established between first and second elements representative of said object and belonging to the first and second images respectively, said stereoscopic correspondence being established by composing a first application between the first elements and corresponding third elements belonging to the third image and a second application between the third elements and the corresponding second elements, the results of the first application are used as arguments for the second application, the first, second and third elements including at least one of contours, image segments, and rectangular image sub-zones.

* * * * *